(12) United States Patent
Kelch et al.

(10) Patent No.: US 6,709,106 B2
(45) Date of Patent: Mar. 23, 2004

(54) METHOD FOR THE MANUFACTURE OF A SPECTACLE LENS, SPECTACLE LENS AND SPECTACLE LENS FAMILY

(75) Inventors: Gerhard Kelch, Aalen (DE); Helmut Wietschorke, Aalen-Wasseralfingen (DE)

(73) Assignee: Carl-Zeiss-Stiftung (DE)

( * ) Notice: Subject to any disclaimer, the term of this patent is extended or adjusted under 35 U.S.C. 154(b) by 297 days.

(21) Appl. No.: 09/841,886

(22) Filed: Apr. 24, 2001

(65) Prior Publication Data

US 2002/0008846 A1 Jan. 24, 2002

(51) Int. Cl.$^7$ .................................................. G02C 7/06
(52) U.S. Cl. ........................................ 351/169; 351/177
(58) Field of Search .............................. 351/168, 169, 351/170, 171, 172, 177

(56) References Cited

U.S. PATENT DOCUMENTS 6,199,983 B1 * 3/2001 Kato et al. .................. 351/169

FOREIGN PATENT DOCUMENTS

| DE | 42 10 008 A | 3/1992 |
| DE | 197 01 312 A1 | 1/1997 |
| DE | 199 17 314 A | 4/1999 |
| EP | 0 741 313 A2 | 11/1996 |
| EP | 0 741 314 A2 | 11/1996 |
| EP | 0 742 463 A2 | 11/1996 |
| EP | 0 742 465 A2 | 11/1996 |
| EP | 0 802 441 A2 | 10/1997 |
| EP | 0 880 046 A | 10/1997 |
| EP | 0 857 993 A2 | 8/1998 |
| JP | WO 2000-48035 | 8/2000 |
| WO | WO 98/12590 | 3/1998 |

OTHER PUBLICATIONS

"Schlub mit der Augenakrobatik" of Oranna Guth & Gerhard Kelch (Zeiss Information mit Jenaer Rundschau 5, (1996), Nr. 7, pp. 22 &–24).

Australian Search Report dated Nov. 07, 2002 (3 pages).

* cited by examiner

Primary Examiner—Scott J. Sugarman
(74) Attorney, Agent, or Firm—Rosenthal & Osha L.L.P.

(57) ABSTRACT

This disclosure relates to a spectacle lens family and methods of manufacturing the same, which in one embodiment has a multifocal property such that along a line between a far-vision reference point and a near-vision reference point spaced apart therefrom a mean spherical power changes continuously from a first value at the far-vision reference point to a second value at the near-vision reference point, wherein the spectacle lenses of the spectacle lens family each exhibit the same difference between the first value and the second value and nominal dioptric powers which are different from one another, wherein the shape of a first lens surface of the spectacle lenses is formed of a sphere and/or a torus to obtain the respective nominal dioptric power, wherein the spectacle lenses of the spectacle lens family have a basic shape of a second lens surface of the spectacle lens in common which provides the multifocal property, and wherein the shape of the second lens surface of each spectacle lens of the spectacle lens family deviates from said basic shape dependent on the respective nominal dioptric power to obtain, with different nominal dioptric powers of different spectacle lenses, a substantially similar distribution of the spherical and astigmatic aberrations in the field of view which are given by the multifocal property.

32 Claims, 13 Drawing Sheets

Fig. 5

| y/x | basic shape -30,00 | -27,50 | -25,00 | -22,50 | -20,00 | -17,50 | -15,00 | -12,50 | -10,00 | -7,50 | -5,00 | -2,50 |
|---|---|---|---|---|---|---|---|---|---|---|---|---|
| 30,00 | | | | | | 5,8034 | 5,3154 | 4,8985 | 4,5512 | 4,2725 | 4,0617 | 3,9178 |
| 27,50 | | | | | 5,6863 | 5,1371 | 4,6570 | 4,2474 | 3,9083 | 3,6374 | 3,4333 | 3,2948 |
| 25,00 | | | | 5,6689 | 5,0621 | 4,5238 | 4,0539 | 3,6536 | 3,3225 | 3,0588 | 2,8609 | 2,7275 |
| 22,50 | | | 5,7522 | 5,0860 | 4,4904 | 3,9635 | 3,5048 | 3,1143 | 2,7915 | 2,5349 | 2,3432 | 2,2151 |
| 20,00 | | 5,9421 | 5,2128 | 4,5568 | 3,9717 | 3,4557 | 3,0078 | 2,6273 | 2,3131 | 2,0641 | 1,8790 | 1,7566 |
| 17,50 | 6,2500 | 5,4518 | 4,7299 | 4,0820 | 3,5059 | 2,9995 | 2,5615 | 2,1909 | 1,8860 | 1,6452 | 1,4674 | 1,3513 |
| 15,00 | 5,8170 | 5,0229 | 4,3052 | 3,6624 | 3,0925 | 2,5937 | 2,1646 | 1,8037 | 1,5086 | 1,2770 | 1,1075 | 0,9986 |
| 12,50 | 5,4511 | 4,6586 | 3,9426 | 3,3020 | 2,7354 | 2,2414 | 1,8191 | 1,4665 | 1,1808 | 0,9591 | 0,7990 | 0,6985 |
| 10,00 | 5,1552 | 4,3629 | 3,6477 | 3,0083 | 2,4435 | 1,9524 | 1,5340 | 1,1870 | 0,9086 | 0,6954 | 0,5442 | 0,4522 |
| 7,50 | 4,9316 | 4,1392 | 3,4247 | 2,7865 | 2,2233 | 1,7340 | 1,3175 | 0,9730 | 0,6987 | 0,4913 | 0,3469 | 0,2617 |
| 5,00 | 4,7827 | 3,9901 | 3,2755 | 2,6376 | 2,0750 | 1,5865 | 1,1709 | 0,8273 | 0,5547 | 0,3500 | 0,2091 | 0,1279 |
| 2,50 | 4,7081 | 3,9155 | 3,2001 | 2,5612 | 1,9979 | 1,5094 | 1,0944 | 0,7511 | 0,4780 | 0,2724 | 0,1311 | 0,0502 |
| 0,00 | 4,7054 | 3,9127 | 3,1965 | 2,5563 | 1,9917 | 1,5023 | 1,0871 | 0,7429 | 0,4670 | 0,2575 | 0,1120 | 0,0273 |
| -2,50 | 4,7719 | 3,9792 | 3,2630 | 2,6222 | 2,0560 | 1,5644 | 1,1464 | 0,7982 | 0,5170 | 0,3011 | 0,1488 | 0,0579 |
| -5,00 | 4,9055 | 4,1120 | 3,3954 | 2,7539 | 2,1860 | 1,6908 | 1,2670 | 0,9118 | 0,6230 | 0,3994 | 0,2394 | 0,1414 |
| -7,50 | 5,1041 | 4,3074 | 3,5878 | 2,9432 | 2,3717 | 1,8715 | 1,4409 | 1,0779 | 0,7811 | 0,5494 | 0,3819 | 0,2770 |
| -10,00 | 5,3649 | 4,5625 | 3,8367 | 3,1860 | 2,6082 | 2,1014 | 1,6636 | 1,2929 | 0,9884 | 0,7492 | 0,5746 | 0,4635 |
| -12,50 | 5,6854 | 4,8747 | 4,1405 | 3,4813 | 2,8954 | 2,3810 | 1,9356 | 1,5572 | 1,2451 | 0,9988 | 0,8175 | 0,7007 |
| -15,00 | 6,0630 | 5,2421 | 4,4976 | 3,8286 | 3,2337 | 2,7111 | 2,2579 | 1,8717 | 1,5522 | 1,2989 | 1,1115 | 0,9892 |
| -17,50 | 6,4952 | 5,6628 | 4,9072 | 4,2278 | 3,6235 | 3,0925 | 2,6312 | 2,2372 | 1,9104 | 1,6505 | 1,4571 | 1,3300 |
| -20,00 | | 6,1358 | 5,3690 | 4,6794 | 4,0658 | 3,5261 | 3,0564 | 2,6545 | 2,3205 | 2,0541 | 1,8552 | 1,7236 |
| -22,50 | | | 5,8837 | 5,1840 | 4,5611 | 4,0125 | 3,5342 | 3,1244 | 2,7832 | 2,5106 | 2,3065 | 2,1708 |
| -25,00 | | | | 5,7424 | 5,1100 | 4,5522 | 4,0652 | 3,6476 | 3,2996 | 3,0211 | 2,8121 | 2,6727 |
| -27,50 | | | | | 5,7130 | 5,1457 | 4,6501 | 4,2251 | 3,8707 | 3,5868 | 3,3733 | 3,2305 |
| -30,00 | | | | | | 5,7936 | 5,2898 | 4,8579 | 4,4977 | 4,2089 | 3,9914 | 3,8452 |

Fig. 5 (continued)

| 0,00 | 2,50 | 5,00 | 7,50 | 10,00 | 12,50 | 15,00 | 17,50 | 20,00 | 22,50 | 25,00 | 27,50 | 30,00 |
|---|---|---|---|---|---|---|---|---|---|---|---|---|
| 3,8394 | 3,8250 | 3,8727 | 3,9807 | 4,1470 | 4,3701 | 4,6493 | 4,9842 | | | | | |
| 3,2204 | 3,2089 | 3,2588 | 3,3684 | 3,5358 | 3,7594 | 4,0385 | 4,3726 | 4,7617 | | | | |
| 2,6574 | 2,6492 | 2,7015 | 2,8129 | 2,9815 | 3,2057 | 3,4846 | 3,8179 | 4,2056 | 4,6480 | | | |
| 2,1494 | 2,1448 | 2,2000 | 2,3135 | 2,4834 | 2,7080 | 2,9868 | 3,3193 | 3,7057 | 4,1464 | 4,6419 | | |
| 1,6958 | 1,6952 | 1,7536 | 1,8694 | 2,0407 | 2,2658 | 2,5443 | 2,8759 | 3,2610 | 3,7001 | 4,1936 | 4,7426 | 4,9496 |
| 1,2957 | 1,2995 | 1,3614 | 1,4799 | 1,6526 | 1,8781 | 2,1562 | 2,4870 | 2,8708 | 3,3082 | 3,7998 | 4,3466 | 4,6055 |
| 0,9491 | 0,9577 | 1,0235 | 1,1446 | 1,3185 | 1,5442 | 1,8219 | 2,1516 | 2,5342 | 2,9700 | 3,4599 | 4,0047 | 4,3152 |
| 0,6560 | 0,6701 | 0,7397 | 0,8630 | 1,0377 | 1,2634 | 1,5404 | 1,8691 | 2,2504 | 2,6848 | 3,1732 | 3,7163 | 4,0782 |
| 0,4170 | 0,4367 | 0,5097 | 0,6344 | 0,8093 | 1,0346 | 1,3109 | 1,6388 | 2,0189 | 2,4521 | 2,9392 | 3,4809 | 3,8934 |
| 0,2326 | 0,2569 | 0,3322 | 0,4576 | 0,6323 | 0,8571 | 1,1327 | 1,4598 | 1,8392 | 2,2714 | 2,7573 | 3,2976 | 3,7605 |
| 0,1026 | 0,1295 | 0,2058 | 0,3312 | 0,5057 | 0,7301 | 1,0052 | 1,3317 | 1,7104 | 2,1420 | 2,6269 | 3,1662 | 3,6798 |
| 0,0255 | 0,0530 | 0,1293 | 0,2543 | 0,4288 | 0,6531 | 0,9278 | 1,2538 | 1,6321 | 2,0633 | 2,5480 | 3,0866 | 3,6517 |
| 0,0000 | 0,0259 | 0,1017 | 0,2268 | 0,4013 | 0,6257 | 0,9003 | 1,2261 | 1,6042 | 2,0356 | 2,5204 | 3,0590 | 3,6760 |
| 0,0257 | 0,0487 | 0,1237 | 0,2486 | 0,4232 | 0,6477 | 0,9226 | 1,2488 | 1,6272 | 2,0589 | 2,5441 | 3,0831 | 3,7526 |
| 0,1033 | 0,1227 | 0,1962 | 0,3205 | 0,4950 | 0,7198 | 0,9953 | 1,3222 | 1,7013 | 2,1334 | 2,6191 | 3,1587 | 3,8816 |
| 0,2332 | 0,2486 | 0,3198 | 0,4430 | 0,6173 | 0,8425 | 1,1187 | 1,4465 | 1,8264 | 2,2592 | 2,7457 | 3,2862 | 4,0630 |
| 0,4146 | 0,4262 | 0,4948 | 0,6167 | 0,7907 | 1,0162 | 1,2931 | 1,6219 | 2,0028 | 2,4366 | 2,9240 | 3,4659 | 4,2968 |
| 0,6471 | 0,6553 | 0,7214 | 0,8421 | 1,0157 | 1,2414 | 1,5189 | 1,8486 | 2,2307 | 2,6657 | 3,1545 | 3,6979 | 4,5835 |
| 0,9315 | 0,9366 | 1,0004 | 1,1198 | 1,2929 | 1,5186 | 1,7966 | 2,1272 | 2,5104 | 2,9469 | 3,4374 | 3,9826 | 4,9238 |
| 1,2685 | 1,2708 | 1,3324 | 1,4504 | 1,6229 | 1,8485 | 2,1270 | 2,4584 | 2,8429 | 3,2810 | 3,7732 | 4,3205 | |
| 1,6588 | 1,6584 | 1,7180 | 1,8346 | 2,0063 | 2,2318 | 2,5107 | 2,8431 | 3,2289 | 3,6687 | 4,1630 | 4,7126 | |
| 2,1031 | 2,1003 | 2,1577 | 2,2729 | 2,4438 | 2,6693 | 2,9487 | 3,2820 | 3,6692 | 4,1109 | 4,6075 | | |
| 2,6023 | 2,5971 | 2,6524 | 2,7661 | 2,9363 | 3,1617 | 3,4418 | 3,7761 | 4,1647 | 4,6084 | | | |
| 3,1574 | 3,1497 | 3,2029 | 3,3151 | 3,4846 | 3,7102 | 3,9909 | 4,3262 | 4,7164 | | | | |
| 3,7693 | 3,7590 | 3,8102 | 3,9211 | 4,0900 | 4,3158 | 4,5973 | 4,9337 | | | | | |

Fig. 6 deviation for small cylinders

| y/x | -30,00 | -27,50 | -25,00 | -22,50 | -20,00 | -17,50 | -15,00 | -12,50 | -10,00 | -7,50 | -5,00 | -2,50 |
|---|---|---|---|---|---|---|---|---|---|---|---|---|
| 30,00 | | | | | | -0,0093 | -0,0082 | -0,0074 | -0,0069 | -0,0069 | -0,0076 | -0,0089 |
| 27,50 | | | | | -0,0087 | -0,0073 | -0,0061 | -0,0052 | -0,0045 | -0,0044 | -0,0048 | -0,0058 |
| 25,00 | | | -0,0080 | -0,0086 | -0,0070 | -0,0056 | -0,0045 | -0,0035 | -0,0028 | -0,0025 | -0,0027 | -0,0034 |
| 22,50 | | -0,0062 | -0,0057 | -0,0068 | -0,0055 | -0,0043 | -0,0033 | -0,0024 | -0,0016 | -0,0012 | -0,0012 | -0,0017 |
| 20,00 | | -0,0036 | -0,0035 | -0,0049 | -0,0040 | -0,0032 | -0,0024 | -0,0016 | -0,0009 | -0,0004 | -0,0003 | -0,0006 |
| 17,50 | -0,0035 | -0,0014 | -0,0015 | -0,0031 | -0,0027 | -0,0022 | -0,0016 | -0,0010 | -0,0005 | -0,0001 | 0,0001 | 0,0000 |
| 15,00 | -0,0011 | 0,0004 | 0,0002 | -0,0015 | -0,0014 | -0,0012 | -0,0010 | -0,0006 | -0,0003 | 0,0000 | 0,0002 | 0,0002 |
| 12,50 | 0,0007 | 0,0017 | 0,0013 | -0,0001 | -0,0002 | -0,0002 | -0,0003 | -0,0002 | -0,0001 | 0,0001 | 0,0002 | 0,0003 |
| 10,00 | 0,0021 | 0,0024 | 0,0020 | 0,0010 | 0,0008 | 0,0006 | 0,0004 | 0,0003 | 0,0002 | 0,0002 | 0,0002 | 0,0002 |
| 7,50 | 0,0029 | 0,0028 | 0,0023 | 0,0017 | 0,0014 | 0,0011 | 0,0008 | 0,0006 | 0,0004 | 0,0003 | 0,0002 | 0,0002 |
| 5,00 | 0,0033 | 0,0028 | 0,0023 | 0,0019 | 0,0016 | 0,0013 | 0,0010 | 0,0007 | 0,0005 | 0,0003 | 0,0002 | 0,0002 |
| 2,50 | 0,0033 | 0,0025 | 0,0021 | 0,0019 | 0,0016 | 0,0012 | 0,0009 | 0,0007 | 0,0004 | 0,0003 | 0,0001 | 0,0001 |
| 0,00 | 0,0030 | 0,0018 | 0,0014 | 0,0017 | 0,0013 | 0,0010 | 0,0007 | 0,0005 | 0,0003 | 0,0002 | 0,0001 | 0,0000 |
| -2,50 | 0,0023 | 0,0008 | 0,0004 | 0,0010 | 0,0008 | 0,0005 | 0,0004 | 0,0003 | 0,0002 | 0,0001 | 0,0001 | 0,0001 |
| -5,00 | 0,0012 | -0,0006 | -0,0008 | 0,0001 | -0,0001 | -0,0001 | 0,0000 | 0,0001 | 0,0002 | 0,0003 | 0,0003 | 0,0002 |
| -7,50 | 0,0003 | -0,0020 | -0,0018 | -0,0008 | -0,0008 | -0,0005 | -0,0002 | 0,0002 | 0,0004 | 0,0006 | 0,0006 | 0,0005 |
| -10,00 | -0,0003 | -0,0031 | -0,0025 | -0,0015 | -0,0011 | -0,0005 | 0,0001 | 0,0005 | 0,0009 | 0,0010 | 0,0010 | 0,0008 |
| -12,50 | -0,0020 | -0,0037 | -0,0026 | -0,0017 | -0,0009 | -0,0002 | 0,0005 | 0,0011 | 0,0014 | 0,0015 | 0,0013 | 0,0009 |
| -15,00 | -0,0035 | -0,0036 | -0,0023 | -0,0015 | -0,0005 | 0,0004 | 0,0012 | 0,0016 | 0,0018 | 0,0018 | 0,0014 | 0,0008 |
| -17,50 | -0,0044 | -0,0028 | -0,0014 | -0,0009 | 0,0002 | 0,0011 | 0,0018 | 0,0021 | 0,0021 | 0,0018 | 0,0012 | 0,0002 |
| -20,00 | -0,0045 | | -0,0004 | -0,0001 | 0,0010 | 0,0018 | 0,0022 | 0,0023 | 0,0021 | 0,0015 | 0,0005 | -0,0008 |
| -22,50 | | | | 0,0007 | 0,0017 | 0,0022 | 0,0023 | 0,0022 | 0,0016 | 0,0007 | -0,0007 | -0,0025 |
| -25,00 | | | | 0,0013 | 0,0019 | 0,0022 | 0,0020 | 0,0015 | 0,0006 | -0,0008 | -0,0026 | -0,0049 |
| -27,50 | | | | | 0,0016 | 0,0016 | 0,0011 | 0,0002 | -0,0012 | -0,0030 | -0,0053 | -0,0081 |
| -30,00 | | | | | | 0,0002 | -0,0006 | -0,0019 | -0,0036 | -0,0059 | -0,0087 | -0,0121 |

Fig. 6 (continued)

| 0,00 | 2,50 | 5,00 | 7,50 | 10,00 | 12,50 | 15,00 | 17,50 | 20,00 | 22,50 | 25,00 | 27,50 | 30,00 |
|---|---|---|---|---|---|---|---|---|---|---|---|---|
| -0,0107 | | | | | | | | | | | | |
| -0,0071 | -0,0127 | | | | | | | | | | | |
| -0,0044 | -0,0088 | -0,0149 | -0,0171 | | | | | | | | | |
| -0,0024 | -0,0058 | -0,0107 | -0,0125 | -0,0192 | -0,0212 | -0,0231 | -0,0248 | | | | | |
| -0,0011 | -0,0035 | -0,0073 | -0,0088 | -0,0144 | -0,0161 | -0,0176 | -0,0191 | -0,0203 | | | | |
| -0,0003 | -0,0018 | -0,0047 | -0,0059 | -0,0103 | -0,0118 | -0,0131 | -0,0143 | -0,0153 | -0,0162 | | | |
| 0,0001 | -0,0008 | -0,0028 | -0,0037 | -0,0072 | -0,0083 | -0,0094 | -0,0103 | -0,0111 | -0,0117 | -0,0120 | | |
| 0,0003 | -0,0002 | -0,0014 | -0,0021 | -0,0047 | -0,0056 | -0,0063 | -0,0070 | -0,0076 | -0,0079 | -0,0080 | -0,0079 | |
| 0,0002 | 0,0001 | -0,0006 | -0,0010 | -0,0028 | -0,0034 | -0,0040 | -0,0044 | -0,0047 | -0,0049 | -0,0049 | -0,0046 | -0,0044 |
| 0,0002 | 0,0002 | -0,0001 | -0,0004 | -0,0015 | -0,0019 | -0,0022 | -0,0024 | -0,0025 | -0,0025 | -0,0024 | -0,0021 | -0,0017 |
| 0,0001 | 0,0002 | 0,0001 | 0,0000 | -0,0006 | -0,0008 | -0,0009 | -0,0009 | -0,0008 | -0,0006 | -0,0004 | 0,0000 | 0,0006 |
| 0,0000 | 0,0001 | 0,0002 | 0,0002 | 0,0000 | -0,0001 | 0,0000 | 0,0001 | 0,0004 | 0,0007 | 0,0011 | 0,0017 | 0,0023 |
| 0,0000 | 0,0001 | 0,0002 | 0,0003 | 0,0003 | 0,0003 | 0,0005 | 0,0008 | 0,0011 | 0,0015 | 0,0021 | 0,0027 | 0,0035 |
| 0,0000 | 0,0000 | 0,0001 | 0,0002 | 0,0004 | 0,0005 | 0,0007 | 0,0010 | 0,0014 | 0,0019 | 0,0025 | 0,0033 | 0,0042 |
| 0,0000 | 0,0000 | 0,0001 | 0,0002 | 0,0003 | 0,0005 | 0,0007 | 0,0010 | 0,0015 | 0,0020 | 0,0027 | 0,0035 | 0,0045 |
| 0,0000 | 0,0000 | 0,0001 | 0,0001 | 0,0002 | 0,0003 | 0,0005 | 0,0008 | 0,0012 | 0,0018 | 0,0025 | 0,0033 | 0,0043 |
| 0,0001 | 0,0000 | 0,0000 | 0,0000 | 0,0000 | 0,0000 | 0,0001 | 0,0003 | 0,0007 | 0,0013 | 0,0020 | 0,0027 | 0,0035 |
| 0,0003 | 0,0000 | 0,0000 | 0,0000 | -0,0005 | -0,0006 | -0,0006 | -0,0005 | -0,0002 | 0,0003 | 0,0009 | 0,0015 | 0,0022 |
| 0,0004 | -0,0001 | -0,0002 | -0,0004 | -0,0012 | -0,0015 | -0,0016 | -0,0016 | -0,0015 | -0,0013 | -0,0008 | -0,0003 | 0,0003 |
| 0,0002 | -0,0003 | -0,0005 | -0,0009 | -0,0023 | -0,0027 | -0,0031 | -0,0033 | -0,0034 | -0,0034 | -0,0032 | -0,0028 | -0,0022 |
| -0,0003 | -0,0008 | -0,0010 | -0,0017 | -0,0037 | -0,0044 | -0,0050 | -0,0055 | -0,0059 | -0,0061 | -0,0061 | -0,0059 | -0,0054 |
| -0,0012 | -0,0016 | -0,0019 | -0,0029 | -0,0057 | -0,0067 | -0,0076 | -0,0083 | -0,0089 | -0,0093 | -0,0096 | -0,0096 | -0,0094 |
| -0,0027 | -0,0030 | -0,0031 | -0,0045 | -0,0082 | -0,0095 | -0,0107 | -0,0117 | -0,0125 | -0,0132 | -0,0138 | -0,0142 | -0,0144 |
| -0,0049 | -0,0049 | -0,0048 | -0,0066 | -0,0113 | -0,0130 | -0,0145 | -0,0158 | -0,0168 | -0,0178 | -0,0187 | -0,0196 | |
| -0,0078 | -0,0076 | -0,0072 | -0,0094 | -0,0152 | -0,0173 | -0,0191 | -0,0206 | -0,0219 | -0,0231 | -0,0244 | | |
| -0,0115 | -0,0110 | -0,0103 | -0,0128 | -0,0198 | -0,0223 | -0,0244 | -0,0262 | -0,0278 | -0,0294 | | | |
| -0,0161 | -0,0152 | -0,0141 | -0,0170 | -0,0252 | -0,0281 | -0,0306 | -0,0327 | -0,0346 | | | | |
| | -0,0202 | -0,0187 | -0,0220 | -0,0314 | -0,0347 | -0,0376 | -0,0401 | | | | | |
| | | -0,0241 | -0,0278 | | | | | | | | | |

Fig. 7

| y/x | -30,00 | -27,50 | -25,00 | -22,50 | -20,00 | -17,50 | -15,00 | -12,50 | -10,00 | -7,50 | -5,00 | -2,50 |
|---|---|---|---|---|---|---|---|---|---|---|---|---|
| | small cylinder | | | | | | | | | | | |
| 30,00 | | | | | | 5,7941 | 5,3072 | 4,8911 | 4,5443 | 4,2655 | 4,0541 | 3,9089 |
| 27,50 | | | | | 5,6775 | 5,1298 | 4,6509 | 4,2423 | 3,9038 | 3,6331 | 3,4285 | 3,2890 |
| 25,00 | | | | 5,6603 | 5,0550 | 4,5181 | 4,0494 | 3,6500 | 3,3197 | 3,0564 | 2,8582 | 2,7242 |
| 22,50 | | | 5,7442 | 5,0792 | 4,4849 | 3,9592 | 3,5015 | 3,1119 | 2,7899 | 2,5337 | 2,3419 | 2,2134 |
| 20,00 | | 5,9360 | 5,2071 | 4,5518 | 3,9677 | 3,4526 | 3,0054 | 2,6257 | 2,3123 | 2,0637 | 1,8786 | 1,7560 |
| 17,50 | 6,2466 | 5,4482 | 4,7264 | 4,0789 | 3,5033 | 2,9973 | 2,5599 | 2,1898 | 1,8855 | 1,6451 | 1,4675 | 1,3513 |
| 15,00 | 5,8158 | 5,0215 | 4,3037 | 3,6609 | 3,0911 | 2,5925 | 2,1637 | 1,8031 | 1,5083 | 1,2770 | 1,1077 | 0,9989 |
| 12,50 | 5,4518 | 4,6590 | 3,9428 | 3,3019 | 2,7352 | 2,2412 | 1,8189 | 1,4663 | 1,1807 | 0,9592 | 0,7992 | 0,6988 |
| 10,00 | 5,1573 | 4,3646 | 3,6490 | 3,0094 | 2,4443 | 1,9530 | 1,5345 | 1,1873 | 0,9088 | 0,6956 | 0,5444 | 0,4524 |
| 7,50 | 4,9345 | 4,1416 | 3,4267 | 2,7882 | 2,2247 | 1,7351 | 1,3184 | 0,9736 | 0,6991 | 0,4916 | 0,3471 | 0,2619 |
| 5,00 | 4,7860 | 3,9929 | 3,2778 | 2,6395 | 2,0766 | 1,5878 | 1,1719 | 0,8280 | 0,5552 | 0,3503 | 0,2092 | 0,1280 |
| 2,50 | 4,7115 | 3,9183 | 3,2025 | 2,5631 | 1,9995 | 1,5107 | 1,0953 | 0,7517 | 0,4784 | 0,2727 | 0,1313 | 0,0502 |
| 0,00 | 4,7084 | 3,9152 | 3,1986 | 2,5580 | 1,9930 | 1,5033 | 1,0878 | 0,7434 | 0,4673 | 0,2577 | 0,1121 | 0,0274 |
| -2,50 | 4,7742 | 3,9810 | 3,2644 | 2,6233 | 2,0568 | 1,5650 | 1,1468 | 0,7985 | 0,5171 | 0,3012 | 0,1489 | 0,0580 |
| -5,00 | 4,9067 | 4,1127 | 3,3958 | 2,7540 | 2,1860 | 1,6907 | 1,2670 | 0,9120 | 0,6232 | 0,3996 | 0,2397 | 0,1416 |
| -7,50 | 5,1037 | 4,3068 | 3,5870 | 2,9423 | 2,3709 | 1,8710 | 1,4408 | 1,0781 | 0,7815 | 0,5500 | 0,3825 | 0,2775 |
| -10,00 | 5,3629 | 4,5605 | 3,8349 | 3,1845 | 2,6071 | 2,1009 | 1,6637 | 1,2935 | 0,9892 | 0,7502 | 0,5756 | 0,4643 |
| -12,50 | 5,6820 | 4,8716 | 4,1380 | 3,4795 | 2,8945 | 2,3809 | 1,9362 | 1,5583 | 1,2465 | 1,0002 | 0,8189 | 0,7016 |
| -15,00 | 6,0586 | 5,2384 | 4,4949 | 3,8270 | 3,2332 | 2,7115 | 2,2590 | 1,8734 | 1,5540 | 1,3007 | 1,1129 | 0,9900 |
| -17,50 | 6,4907 | 5,6592 | 4,9049 | 4,2268 | 3,6238 | 3,0936 | 2,6329 | 2,2393 | 1,9125 | 1,6523 | 1,4583 | 1,3302 |
| -20,00 | | 6,1330 | 5,3676 | 4,6793 | 4,0668 | 3,5279 | 3,0586 | 2,6569 | 2,3226 | 2,0556 | 1,8558 | 1,7227 |
| -22,50 | | | 5,8833 | 5,1848 | 4,5628 | 4,0147 | 3,5365 | 3,1266 | 2,7848 | 2,5113 | 2,3058 | 2,1683 |
| -25,00 | | | | 5,7437 | 5,1120 | 4,5544 | 4,0672 | 3,6491 | 3,3002 | 3,0203 | 2,8095 | 2,6677 |
| -27,50 | | | | | 5,7146 | 5,1473 | 4,6512 | 4,2253 | 3,8695 | 3,5838 | 3,3681 | 3,2223 |
| -30,00 | | | | | | 5,7939 | 5,2892 | 4,8560 | 4,4940 | 4,2030 | 3,9826 | 3,8331 |

Fig. 7 (continued)

| 0,00 | 2,50 | 5,00 | 7,50 | 10,00 | 12,50 | 15,00 | 17,50 | 20,00 | 22,50 | 25,00 | 27,50 | 30,00 |
|---|---|---|---|---|---|---|---|---|---|---|---|---|
| 3,8288 | 3,8123 | 3,8578 | 3,9636 | 4,1278 | 4,3489 | 4,6262 | 4,9594 | | | | | |
| 3,2133 | 3,2001 | 3,2481 | 3,3558 | 3,5215 | 3,7434 | 4,0209 | 4,3535 | 4,7414 | | | | |
| 2,6530 | 2,6434 | 2,6942 | 2,8040 | 2,9712 | 3,1939 | 3,4715 | 3,8036 | 4,1903 | 4,6319 | | | |
| 2,1470 | 2,1414 | 2,1953 | 2,3076 | 2,4763 | 2,6997 | 2,9774 | 3,3090 | 3,6946 | 4,1347 | 4,6299 | | |
| 1,6947 | 1,6933 | 1,7508 | 1,8657 | 2,0360 | 2,2602 | 2,5379 | 2,8689 | 3,2534 | 3,6922 | 4,1856 | 4,7347 | 4,9452 |
| 1,2954 | 1,2987 | 1,3600 | 1,4778 | 1,6498 | 1,8746 | 2,1523 | 2,4826 | 2,8661 | 3,3033 | 3,7950 | 4,3419 | 4,6038 |
| 0,9492 | 0,9576 | 1,0229 | 1,1436 | 1,3170 | 1,5424 | 1,8197 | 2,1493 | 2,5317 | 2,9675 | 3,4575 | 4,0026 | 4,3158 |
| 0,6563 | 0,6703 | 0,7396 | 0,8626 | 1,0371 | 1,2626 | 1,5395 | 1,8683 | 2,2496 | 2,6842 | 3,1728 | 3,7163 | 4,0805 |
| 0,4173 | 0,4369 | 0,5098 | 0,6345 | 0,8093 | 1,0346 | 1,3109 | 1,6389 | 2,0193 | 2,4528 | 2,9403 | 3,4826 | 3,8969 |
| 0,2328 | 0,2571 | 0,3324 | 0,4578 | 0,6326 | 0,8574 | 1,1332 | 1,4606 | 1,8403 | 2,2729 | 2,7593 | 3,3004 | 3,7647 |
| 0,1026 | 0,1296 | 0,2060 | 0,3314 | 0,5061 | 0,7306 | 1,0059 | 1,3328 | 1,7119 | 2,1439 | 2,6295 | 3,1695 | 3,6843 |
| 0,0256 | 0,0530 | 0,1294 | 0,2546 | 0,4292 | 0,6536 | 0,9285 | 1,2549 | 1,6336 | 2,0654 | 2,5507 | 3,0901 | 3,6560 |
| 0,0000 | 0,0259 | 0,1018 | 0,2269 | 0,4016 | 0,6260 | 0,9008 | 1,2269 | 1,6055 | 2,0374 | 2,5229 | 3,0623 | 3,6796 |
| 0,0257 | 0,0487 | 0,1237 | 0,2486 | 0,4232 | 0,6477 | 0,9227 | 1,2491 | 1,6279 | 2,0602 | 2,5461 | 3,0858 | 3,7548 |
| 0,1034 | 0,1227 | 0,1960 | 0,3202 | 0,4945 | 0,7192 | 0,9947 | 1,3217 | 1,7011 | 2,1337 | 2,6200 | 3,1602 | 3,8819 |
| 0,2335 | 0,2486 | 0,3193 | 0,4421 | 0,6161 | 0,8410 | 1,1171 | 1,4448 | 1,8249 | 2,2580 | 2,7448 | 3,2859 | 4,0608 |
| 0,4149 | 0,4259 | 0,4937 | 0,6150 | 0,7885 | 1,0135 | 1,2901 | 1,6186 | 1,9994 | 2,4332 | 2,9209 | 3,4631 | 4,2914 |
| 0,6473 | 0,6545 | 0,7196 | 0,8392 | 1,0120 | 1,2369 | 1,5139 | 1,8431 | 2,2248 | 2,6596 | 3,1484 | 3,6921 | 4,5741 |
| 0,9312 | 0,9350 | 0,9973 | 1,1153 | 1,2873 | 1,5119 | 1,7891 | 2,1189 | 2,5015 | 2,9376 | 3,4278 | 3,9729 | 4,9094 |
| 1,2673 | 1,2678 | 1,3276 | 1,4438 | 1,6147 | 1,8389 | 2,1163 | 2,4467 | 2,8304 | 3,2677 | 3,7595 | 4,3063 | |
| 1,6561 | 1,6535 | 1,7108 | 1,8252 | 1,9950 | 2,2187 | 2,4962 | 2,8273 | 3,2120 | 3,6509 | 4,1443 | 4,6930 | |
| 2,0982 | 2,0927 | 2,1475 | 2,2601 | 2,4287 | 2,6520 | 2,9297 | 3,2614 | 3,6473 | 4,0877 | 4,5830 | | |
| 2,5945 | 2,5861 | 2,6383 | 2,7490 | 2,9165 | 3,1395 | 3,4174 | 3,7499 | 4,1369 | 4,5790 | | | |
| 3,1459 | 3,1345 | 3,1842 | 3,2931 | 3,4594 | 3,6821 | 3,9603 | 4,2935 | 4,6817 | | | | |
| 3,7533 | 3,7388 | 3,7861 | 3,8933 | 4,0586 | 4,2811 | 4,5597 | 4,8937 | | | | | |

Fig. 8 deviation for large cylinders

| y/x | -30,00 | -27,50 | -25,00 | -22,50 | -20,00 | -17,50 | -15,00 | -12,50 | -10,00 | -7,50 | -5,00 | -2,50 |
|---|---|---|---|---|---|---|---|---|---|---|---|---|
| 30,00 | | | | | | -0,1857 | -0,1798 | -0,1755 | -0,1715 | -0,1674 | -0,1631 | -0,1582 |
| 27,50 | | | | | -0,1518 | -0,1451 | -0,1391 | -0,1349 | -0,1322 | -0,1296 | -0,1264 | -0,1225 |
| 25,00 | | | | -0,1219 | -0,1154 | -0,1092 | -0,1038 | -0,1005 | -0,0988 | -0,0973 | -0,0951 | -0,0924 |
| 22,50 | | | -0,0980 | -0,0910 | -0,0842 | -0,0783 | -0,0739 | -0,0716 | -0,0707 | -0,0701 | -0,0689 | -0,0672 |
| 20,00 | | -0,0758 | -0,0713 | -0,0650 | -0,0584 | -0,0530 | -0,0494 | -0,0479 | -0,0477 | -0,0475 | -0,0470 | -0,0461 |
| 17,50 | -0,0498 | -0,0502 | -0,0483 | -0,0442 | -0,0390 | -0,0344 | -0,0315 | -0,0303 | -0,0300 | -0,0298 | -0,0295 | -0,0290 |
| 15,00 | -0,0256 | -0,0274 | -0,0283 | -0,0277 | -0,0256 | -0,0229 | -0,0207 | -0,0193 | -0,0183 | -0,0175 | -0,0167 | -0,0162 |
| 12,50 | -0,0053 | -0,0086 | -0,0115 | -0,0135 | -0,0141 | -0,0135 | -0,0126 | -0,0117 | -0,0108 | -0,0097 | -0,0087 | -0,0079 |
| 10,00 | 0,0104 | 0,0061 | 0,0022 | -0,0009 | -0,0030 | -0,0040 | -0,0048 | -0,0052 | -0,0051 | -0,0044 | -0,0037 | -0,0031 |
| 7,50 | 0,0228 | 0,0178 | 0,0130 | 0,0088 | 0,0056 | 0,0032 | 0,0012 | -0,0004 | -0,0012 | -0,0012 | -0,0010 | -0,0008 |
| 5,00 | 0,0323 | 0,0271 | 0,0216 | 0,0163 | 0,0117 | 0,0080 | 0,0051 | 0,0027 | 0,0011 | 0,0003 | 0,0001 | 0,0000 |
| 2,50 | 0,0388 | 0,0333 | 0,0275 | 0,0215 | 0,0159 | 0,0112 | 0,0076 | 0,0047 | 0,0026 | 0,0012 | 0,0004 | 0,0001 |
| 0,00 | 0,0435 | 0,0379 | 0,0316 | 0,0250 | 0,0185 | 0,0131 | 0,0088 | 0,0054 | 0,0028 | 0,0011 | 0,0003 | 0,0000 |
| -2,50 | 0,0467 | 0,0405 | 0,0333 | 0,0259 | 0,0190 | 0,0135 | 0,0090 | 0,0052 | 0,0026 | 0,0010 | 0,0003 | 0,0000 |
| -5,00 | 0,0468 | 0,0398 | 0,0315 | 0,0234 | 0,0165 | 0,0116 | 0,0081 | 0,0052 | 0,0032 | 0,0019 | 0,0014 | 0,0013 |
| -7,50 | 0,0442 | 0,0368 | 0,0286 | 0,0211 | 0,0149 | 0,0109 | 0,0085 | 0,0068 | 0,0056 | 0,0048 | 0,0044 | 0,0040 |
| -10,00 | 0,0406 | 0,0340 | 0,0275 | 0,0221 | 0,0179 | 0,0150 | 0,0132 | 0,0120 | 0,0113 | 0,0107 | 0,0101 | 0,0092 |
| -12,50 | 0,0380 | 0,0333 | 0,0297 | 0,0275 | 0,0257 | 0,0240 | 0,0225 | 0,0215 | 0,0209 | 0,0203 | 0,0192 | 0,0174 |
| -15,00 | 0,0384 | 0,0364 | 0,0364 | 0,0376 | 0,0383 | 0,0376 | 0,0364 | 0,0355 | 0,0348 | 0,0337 | 0,0318 | 0,0287 |
| -17,50 | 0,0436 | 0,0450 | 0,0483 | 0,0526 | 0,0556 | 0,0561 | 0,0551 | 0,0542 | 0,0530 | 0,0511 | 0,0480 | 0,0431 |
| -20,00 | | 0,0598 | 0,0661 | 0,0727 | 0,0777 | 0,0795 | 0,0790 | 0,0778 | 0,0758 | 0,0726 | 0,0678 | 0,0606 |
| -22,50 | | | 0,0897 | 0,0982 | 0,1050 | 0,1079 | 0,1079 | 0,1063 | 0,1031 | 0,0982 | 0,0912 | 0,0815 |
| -25,00 | | | | 0,1294 | 0,1375 | 0,1413 | 0,1413 | 0,1390 | 0,1344 | 0,1275 | 0,1181 | 0,1058 |
| -27,50 | | | | | 0,1753 | 0,1791 | 0,1789 | 0,1756 | 0,1694 | 0,1603 | 0,1483 | 0,1332 |
| -30,00 | | | | | | 0,2211 | 0,2203 | 0,2157 | 0,2077 | 0,1963 | 0,1817 | 0,1637 |

Fig. 8 (continued)

| 0,00 | 2,50 | 5,00 | 7,50 | 10,00 | 12,50 | 15,00 | 17,50 | 20,00 | 22,50 | 25,00 | 27,50 | 30,00 |
|---|---|---|---|---|---|---|---|---|---|---|---|---|
| 0,1526 | -0,1461 | -0,1391 | -0,1316 | -0,1242 | -0,1167 | -0,1093 | -0,1027 | | | | | |
| -0,1181 | -0,1130 | -0,1073 | -0,1013 | -0,0951 | -0,0886 | -0,0821 | -0,0760 | | | | | |
| -0,0891 | -0,0852 | -0,0809 | -0,0761 | -0,0709 | -0,0653 | -0,0596 | -0,0538 | | | | | |
| -0,0650 | -0,0622 | -0,0590 | -0,0553 | -0,0509 | -0,0461 | -0,0410 | -0,0355 | | | | | |
| -0,0449 | -0,0432 | -0,0410 | -0,0383 | -0,0347 | -0,0306 | -0,0260 | -0,0209 | | | | | |
| -0,0283 | -0,0275 | -0,0263 | -0,0247 | -0,0220 | -0,0187 | -0,0146 | -0,0100 | -0,0710 | | | | |
| -0,0157 | -0,0154 | -0,0151 | -0,0143 | -0,0126 | -0,0101 | -0,0067 | -0,0027 | -0,0485 | | -0,0225 | | |
| -0,0074 | -0,0073 | -0,0074 | -0,0072 | -0,0062 | -0,0044 | -0,0018 | 0,0016 | -0,0301 | -0,0443 | -0,0084 | -0,0073 | |
| -0,0029 | -0,0029 | -0,0031 | -0,0031 | -0,0025 | -0,0012 | 0,0009 | 0,0038 | -0,0158 | -0,0256 | 0,0014 | 0,0025 | |
| -0,0008 | -0,0010 | -0,0012 | -0,0012 | -0,0008 | 0,0002 | 0,0020 | 0,0046 | -0,0053 | -0,0113 | 0,0079 | 0,0094 | 0,0035 |
| 0,0000 | -0,0002 | -0,0004 | -0,0005 | -0,0003 | 0,0004 | 0,0019 | 0,0041 | 0,0016 | -0,0012 | 0,0123 | 0,0144 | 0,0110 |
| 0,0001 | -0,0001 | -0,0003 | -0,0006 | -0,0007 | 0,0005 | 0,0004 | 0,0020 | 0,0055 | 0,0054 | 0,0148 | 0,0175 | 0,0164 |
| 0,0000 | -0,0001 | -0,0005 | -0,0011 | -0,0017 | -0,0021 | -0,0022 | -0,0016 | 0,0074 | 0,0093 | 0,0152 | 0,0182 | 0,0193 |
| 0,0000 | 0,0000 | -0,0008 | -0,0020 | -0,0032 | -0,0044 | -0,0055 | -0,0061 | 0,0078 | 0,0112 | 0,0132 | 0,0160 | 0,0196 |
| 0,0002 | 0,0000 | -0,0008 | -0,0028 | -0,0050 | -0,0072 | -0,0093 | -0,0110 | 0,0069 | 0,0115 | 0,0090 | 0,0115 | 0,0175 |
| 0,0012 | 0,0006 | -0,0008 | -0,0034 | -0,0068 | -0,0103 | -0,0136 | -0,0167 | 0,0042 | 0,0100 | 0,0035 | 0,0055 | 0,0136 |
| 0,0035 | 0,0022 | -0,0002 | -0,0033 | -0,0084 | -0,0136 | -0,0186 | -0,0234 | -0,0003 | 0,0066 | -0,0033 | -0,0019 | 0,0077 |
| 0,0077 | 0,0052 | 0,0013 | -0,0024 | -0,0095 | -0,0168 | -0,0240 | -0,0308 | -0,0059 | 0,0015 | -0,0117 | -0,0112 | 0,0006 |
| 0,0145 | 0,0101 | 0,0042 | -0,0003 | -0,0099 | -0,0196 | -0,0292 | -0,0384 | -0,0120 | -0,0048 | -0,0219 | -0,0226 | -0,0111 |
| 0,0239 | 0,0169 | 0,0087 | 0,0003 | -0,0090 | -0,0216 | -0,0339 | -0,0458 | -0,0192 | -0,0121 | -0,0340 | -0,0360 | -0,0235 |
| 0,0358 | 0,0260 | 0,0150 | 0,0034 | -0,0068 | -0,0225 | -0,0378 | -0,0524 | -0,0277 | -0,0209 | -0,0478 | -0,0515 | -0,0378 |
| 0,0505 | 0,0375 | 0,0235 | 0,0088 | -0,0028 | -0,0218 | -0,0403 | -0,0578 | -0,0372 | -0,0313 | -0,0625 | -0,0686 | -0,0546 |
| 0,0683 | 0,0519 | 0,0345 | 0,0163 | 0,0034 | -0,0192 | -0,0410 | -0,0615 | -0,0472 | -0,0430 | -0,0778 | -0,0871 | -0,0741 |
| 0,0893 | 0,0693 | 0,0482 | 0,0262 | 0,0119 | -0,0144 | -0,0396 | -0,0635 | -0,0570 | -0,0552 | -0,0936 | -0,1069 | -0,0959 |
| 0,1133 | 0,0896 | 0,0645 | 0,0384 | 0,0230 | -0,0071 | -0,0362 | -0,0642 | -0,0663 | -0,0677 | -0,1098 | | |
| 0,1403 | 0,1126 | 0,0834 | 0,0534 | | | | | -0,0747 | -0,0800 | | | |
| | | | | | | | | -0,0818 | -0,0919 | | | |
| | | | | | | | | -0,0876 | -0,1032 | | | |

Fig. 9 large cylinder

| y/x | -30,00 | -27,50 | -25,00 | -22,50 | -20,00 | -17,50 | -15,00 | -12,50 | -10,00 | -7,50 | -5,00 | -2,50 |
|---|---|---|---|---|---|---|---|---|---|---|---|---|
| 30,00 |  |  |  |  |  | 5,6177 | 5,1357 | 4,7230 | 4,3797 | 4,1050 | 3,8986 | 3,7596 |
| 27,50 |  |  |  |  | 5,5344 | 4,9920 | 4,5179 | 4,1125 | 3,7760 | 3,5079 | 3,3070 | 3,1722 |
| 25,00 |  |  | 5,6542 | 5,5470 | 4,9467 | 4,4146 | 3,9501 | 3,5531 | 3,2237 | 2,9616 | 2,7658 | 2,6351 |
| 22,50 |  | 5,8663 | 5,1414 | 4,9950 | 4,4062 | 3,8852 | 3,4308 | 3,0427 | 2,7207 | 2,4648 | 2,2743 | 2,1479 |
| 20,00 |  | 5,4016 | 4,6816 | 4,4917 | 3,9133 | 3,4028 | 2,9583 | 2,5793 | 2,2655 | 2,0166 | 1,8320 | 1,7105 |
| 17,50 | 6,2002 | 4,9955 | 4,2769 | 4,0379 | 3,4669 | 2,9651 | 2,5300 | 2,1606 | 1,8559 | 1,6154 | 1,4379 | 1,3223 |
| 15,00 | 5,7914 | 4,6500 | 3,9311 | 3,6347 | 3,0669 | 2,5708 | 2,1440 | 1,7845 | 1,4902 | 1,2596 | 1,0908 | 0,9825 |
| 12,50 | 5,4458 | 4,3690 | 3,6499 | 3,2885 | 2,7213 | 2,2279 | 1,8065 | 1,4548 | 1,1700 | 0,9494 | 0,7903 | 0,6906 |
| 10,00 | 5,1656 | 4,1570 | 3,4377 | 3,0074 | 2,4405 | 1,9483 | 1,5293 | 1,1818 | 0,9035 | 0,6909 | 0,5405 | 0,4491 |
| 7,50 | 4,9544 | 4,0172 | 3,2971 | 2,7953 | 2,2289 | 1,7372 | 1,3187 | 0,9727 | 0,6976 | 0,4901 | 0,3459 | 0,2609 |
| 5,00 | 4,8150 | 3,9489 | 3,2276 | 2,6539 | 2,0867 | 1,5945 | 1,1759 | 0,8300 | 0,5558 | 0,3503 | 0,2091 | 0,1279 |
| 2,50 | 4,7469 | 3,9506 | 3,2281 | 2,5827 | 2,0138 | 1,5206 | 1,1020 | 0,7558 | 0,4805 | 0,2736 | 0,1315 | 0,0503 |
| 0,00 | 4,7489 | 4,0197 | 3,2963 | 2,5813 | 2,0102 | 1,5154 | 1,0959 | 0,7482 | 0,4698 | 0,2586 | 0,1123 | 0,0273 |
| -2,50 | 4,8185 | 4,1517 | 3,4269 | 2,6481 | 2,0751 | 1,5779 | 1,1553 | 0,8034 | 0,5195 | 0,3021 | 0,1491 | 0,0581 |
| -5,00 | 4,9523 | 4,3442 | 3,6164 | 2,7773 | 2,2025 | 1,7024 | 1,2751 | 0,9170 | 0,6262 | 0,4013 | 0,2408 | 0,1426 |
| -7,50 | 5,1483 | 4,5965 | 3,8642 | 2,9642 | 2,3866 | 1,8824 | 1,4494 | 1,0847 | 0,7867 | 0,5543 | 0,3862 | 0,2810 |
| -10,00 | 5,4056 | 4,9080 | 4,1701 | 3,2081 | 2,6261 | 2,1165 | 1,6768 | 1,3049 | 0,9996 | 0,7599 | 0,5847 | 0,4727 |
| -12,50 | 5,7234 | 5,2785 | 4,5339 | 3,5087 | 2,9211 | 2,4050 | 1,9581 | 1,5787 | 1,2660 | 1,0190 | 0,8367 | 0,7180 |
| -15,00 | 6,1014 | 5,7078 | 4,9555 | 3,8661 | 3,2719 | 2,7487 | 2,2942 | 1,9072 | 1,5870 | 1,3326 | 1,1433 | 1,0179 |
| -17,50 | 6,5388 | 6,1955 | 5,4351 | 4,2804 | 3,6791 | 3,1485 | 2,6863 | 2,2914 | 1,9634 | 1,7016 | 1,5051 | 1,3730 |
| -20,00 |  |  | 5,9734 | 4,7521 | 4,1435 | 3,6056 | 3,1354 | 2,7324 | 2,3963 | 2,1267 | 1,9230 | 1,7842 |
| -22,50 |  |  |  | 5,2822 | 4,6661 | 4,1204 | 3,6421 | 3,2307 | 2,8863 | 2,6088 | 2,3977 | 2,2523 |
| -25,00 |  |  |  | 5,8718 | 5,2476 | 4,6935 | 4,2065 | 3,7867 | 3,4340 | 3,1486 | 2,9302 | 2,7785 |
| -27,50 |  |  |  |  | 5,8883 | 5,3249 | 4,8290 | 4,4008 | 4,0401 | 3,7470 | 3,5216 | 3,3637 |
| -30,00 |  |  |  |  |  | 6,0147 | 5,5100 | 5,0736 | 4,7053 | 4,4051 | 4,1731 | 4,0089 |

Fig. 9 (continued)

| 0,00 | 2,50 | 5,00 | 7,50 | 10,00 | 12,50 | 15,00 | 17,50 | 20,00 | 22,50 | 25,00 | 27,50 | 30,00 |
|---|---|---|---|---|---|---|---|---|---|---|---|---|
| 3,6869 | 3,6789 | 3,7336 | 3,8491 | 4,0228 | 4,2534 | 4,5400 | 4,8815 | | | | | |
| 3,1023 | 3,0959 | 3,1514 | 3,2670 | 3,4407 | 3,6708 | 3,9564 | 4,2966 | 4,6907 | | | | |
| 2,5683 | 2,5639 | 2,6206 | 2,7368 | 2,9107 | 3,1404 | 3,4250 | 3,7641 | 4,1571 | 4,6037 | | | |
| 2,0845 | 2,0826 | 2,1410 | 2,2582 | 2,4325 | 2,6620 | 2,9458 | 3,2838 | 3,6755 | 4,1208 | 4,6194 | | |
| 1,6509 | 1,6520 | 1,7126 | 1,8311 | 2,0059 | 2,2352 | 2,5182 | 2,8550 | 3,2453 | 3,6887 | 4,1852 | 4,7352 | |
| 1,2674 | 1,2720 | 1,3351 | 1,4553 | 1,6306 | 2,2352 | 2,1416 | 2,4770 | 2,8655 | 3,3070 | 3,8012 | 4,3491 | 4,9531 |
| 0,9334 | 0,9423 | 1,0084 | 1,1303 | 1,3060 | 1,5342 | 1,8152 | 2,1490 | 2,5358 | 2,9754 | 3,4678 | 4,0141 | 4,6165 |
| 0,6486 | 0,6628 | 0,7323 | 0,8558 | 1,0316 | 1,2589 | 1,5386 | 1,8708 | 2,2559 | 2,6942 | 3,1855 | 3,7308 | 4,3316 |
| 0,4141 | 0,4338 | 0,5065 | 0,6313 | 0,8069 | 1,0334 | 1,3117 | 1,6426 | 2,0263 | 2,4634 | 2,9540 | 3,4984 | 4,0975 |
| 0,2318 | 0,2559 | 0,3311 | 0,4564 | 0,6315 | 0,8573 | 1,1347 | 1,4644 | 1,8470 | 2,2829 | 2,7725 | 3,3158 | 3,9130 |
| 0,1025 | 0,1293 | 0,2054 | 0,3306 | 0,5054 | 0,7304 | 1,0070 | 1,3358 | 1,7173 | 2,1520 | 2,6401 | 3,1821 | 3,7780 |
| 0,0256 | 0,0529 | 0,1290 | 0,2538 | 0,4281 | 0,6526 | 0,9282 | 1,2558 | 1,6363 | 2,0699 | 2,5570 | 3,0981 | 3,6934 |
| 0,0000 | 0,0258 | 0,1012 | 0,2257 | 0,3997 | 0,6236 | 0,8981 | 1,2245 | 1,6039 | 2,0370 | 2,5239 | 3,0645 | 3,6594 |
| 0,0259 | 0,0487 | 0,1229 | 0,2467 | 0,4201 | 0,6433 | 0,9171 | 1,2427 | 1,6214 | 2,0541 | 2,5408 | 3,0812 | 3,6754 |
| 0,1045 | 0,1233 | 0,1953 | 0,3177 | 0,4901 | 0,7127 | 0,9860 | 1,3112 | 1,6892 | 2,1213 | 2,6075 | 3,1476 | 3,7415 |
| 0,2367 | 0,2509 | 0,3196 | 0,4397 | 0,6105 | 0,8322 | 1,1051 | 1,4298 | 1,8072 | 2,2384 | 2,7238 | 3,2637 | 3,8581 |
| 0,4223 | 0,4314 | 0,4961 | 0,6134 | 0,7823 | 1,0026 | 1,2745 | 1,5985 | 1,9751 | 2,4053 | 2,8900 | 3,4299 | 4,0252 |
| 0,6617 | 0,6654 | 0,7256 | 0,8397 | 1,0062 | 1,2246 | 1,4950 | 1,8178 | 2,1934 | 2,6227 | 3,1068 | 3,6465 | 4,2422 |
| 0,9554 | 0,9536 | 1,0091 | 1,1195 | 1,2831 | 1,4990 | 1,7675 | 2,0888 | 2,4633 | 2,8917 | 3,3749 | 3,9140 | 4,5095 |
| 1,3043 | 1,2967 | 1,3474 | 1,4538 | 1,6139 | 1,8269 | 2,0931 | 2,4126 | 2,7859 | 3,2132 | 3,6954 | 4,2334 | 4,8279 |
| 1,7093 | 1,6959 | 1,7415 | 1,8434 | 1,9995 | 2,2093 | 2,4730 | 2,7907 | 3,1626 | 3,5886 | 4,0694 | 4,6057 | |
| 2,1714 | 2,1522 | 2,1923 | 2,2892 | 2,4411 | 2,6474 | 2,9085 | 3,2243 | 3,5945 | 4,0189 | 4,4977 | | |
| 2,6916 | 2,6664 | 2,7006 | 2,7923 | 2,9396 | 3,1425 | 3,4008 | 3,7146 | 4,0829 | 4,5052 | | | |
| 3,2708 | 3,2393 | 3,2674 | 3,3536 | 3,4965 | 3,6958 | 3,9513 | 4,2628 | 4,6288 | | | | |
| 3,9096 | 3,8716 | 3,8936 | 3,9745 | 4,1131 | 4,3087 | 4,5611 | 4,8696 | | | | | |

METHOD FOR THE MANUFACTURE OF A SPECTACLE LENS, SPECTACLE LENS AND SPECTACLE LENS FAMILY

FIELD OF THE INVENTION

The present invention relates to a spectacle lens for the correction of an eyesight deficiency of a spectacle wearer as well as to a spectacle lens family comprising a plurality of such spectacle lenses. Furthermore, the invention relates to a method for the manufacture of such a spectacle lens as well as for the manufacture of the spectacle lenses of the spectacle lens family.

BACKGROUND OF THE INVENTION

A spectacle lens for the correction of an eyesight deficiency is characterized by a nominal prismatic power for the correction of an eyesight deficiency as well as by a nominal dioptric power for the correction of the eyesight deficiency, the nominal dioptric power comprising in particular a nominal spherical power for the correction of a spherical eyesight deficiency and a nominal astigmatic power for the correction of an astigmatic eyesight deficiency. To this end, the degree of a spherical cut and a cylindrical or/and toroidal cut of the lens as well as the orientation thereof must be defined. Moreover, in many cases such a spectacle lens also provides a multifocal property which compensates a deficient adaptation capacity of the eye when changing from the viewing of a far object to the viewing of a near object. For this purpose, the spectacle lens has a so-called far-vision reference point and a so-called near-vision reference point spaced apart therefrom, the line of sight of the wearer, when viewing the far-away object, passing through the spectacle lens in the area of the far-vision reference point and, when viewing a near object with the line of sight extending downwardly, passing through the spectacle lens in the area of the near-vision reference point. The mean dioptric power of the spectacle lens at the near-vision reference point differs from the mean dioptric power of the spectacle lens at the far-vision reference point by a predetermined value, the so-called "addition". A spectacle lens which is adapted to a specific wearer is thus characterized at least by the parameters: nominal dioptric power, optionally the orientation thereof and the desired addition.

The spherical and astigmatic powers are usually indicated in diopters which are usually rounded up or down to the nearest fourth of a diopter.

The term "mean spherical power" as used herein is defined as the mean value of the first and second main cut, as it is, for example, described in DIN 58208, part 1–25.

Due to the multiplicity of the characterizing parameters to be at least employed and the individual differences thereof between different spectacle wearers, it is apparent that an automatic manufacture of spectacle lenses requires an extreme flexibility as far as the parameters are concerned which characterize the spectacle lens.

A spectacle lens for the correction of an eyesight deficiency of a spectacle wearer is known from EP 0857993 A2, said lens likewise exhibiting a multifocal property. In said conventional spectacle lens the lens surface facing away from the wearer's eye is of spherical or rotational-symmetric aspherical design. A plurality of spectacle lenses for the correction of different eyesight deficiencies have this shape of the lens surface facing away from the eye in common so that at least this lens surface is easy to manufacture even in individualized mass production. The correction of the eyesight deficiency, i.e., the provision of a spherical or/and toroidal cut, as well as the multifocal property, are provided by the lens surface facing towards the wearer's eye.

The known spectacle lens has been found to be disadvantageous in so far as the common manufacture of spectacle lenses of specific different combinations of eyesight deficiencies result in excessively thick spectacle lenses and the imaging quality of the spectacle lenses is in need of improvement.

SUMMARY OF THE INVENTION

In one aspect, the present invention relates to a spectacle lens which combines good imaging properties with the ability to mass produce spectacle lenses for the correction of different eyesight deficiencies. In another aspect the present invention relates to a spectacle lens family, the members of which compensate different eyesight deficiencies and, at the same time, can be produced in common in mass production while a comparatively good imaging quality is maintained.

In another aspect, the present invention relates to a method for the manufacture of such a spectacle lens and such a spectacle lens family.

According to a first aspect, the invention provides a spectacle lens for the correction of an eye deficiency of a spectacle wearer, which spectacle lens comprises a lens surface facing towards the eye of the spectacle wearer and a lens surface facing away from the eye of the spectacle wearer.

Preferably, the lens surface facing towards the eye functions directly to correct the eyesight deficiency and its shape is therefore merely defined by a sphere and/or a torus so that, as a result, a nominal dioptric power is produced to compensate the spectacle wearer's eyesight deficiency.

Preferably, the function of the lens surface facing away from the eye comprises, on the one hand, the provision of a multifocal property and, on the other hand, the compensation of certain imaging alterations which are due to the interactions between the eyesight deficiency correction provided by the lens surface facing towards the eye and the multifocal property provided by the lens surface facing away from the eye and which furthermore result from the interaction between the multifocal property and the specific geometric position of the spectacle lens relative to the spectacle wearer. The alterations caused by the geometric position of the spectacle lens relative to the spectacle wearer include in particular the following parameters:

Distance between the two eyes of the spectacle wearer.
  The multifocal property of the spectacle lens is perceived by the spectacle wearer as desired if, when viewing a far object, his sightline passes through the far-vision reference point and, accordingly, when viewing a near object, his sightline passes through the near-vision reference point of the spectacle. It has been found that this requirement is fulfilled better if the near-vision reference point is offset further inwards relative to the far-vision reference point for a spectacle wearer having a large eye distance than for a spectacle wearer having a small eye distance.

Distance between the eye of the spectacle wearer and the spectacle lens when worn by the spectacle wearer, i.e., in its position of use.
  It has been found that the distance between the eye and the spectacle lens likewise influences the effect of the multifocal property on the spectacle wearer and, accordingly, a correcting design of the lens surface facing away from the eye can be provided to the effect that the spectacle wearer perceives the multifocal property as optimal as possible. In this respect, it is particularly favorable for this distance to be incorporated also in the correction of the interaction between the eyesight deficiency correction and the multifocal property, and, moreover, it is also favorable, in order to define the position of the far-vision reference point and the near-vision reference point relative to one another, to take both the eye distance and the distance between eye an spectacle lens into consideration.

Inclination of the spectacle lens relative to the spectacle wearer when his sightline passes, for example, through the far-vision reference point to a distant object.

The alteration of the interaction between the eyesight deficiency correction and the multifocal property caused by an alteration of the spectacle lens inclination can also be reduced with a known spectacle lens inclination.

Preferred distance between the eye of the spectacle wearer and an object to be viewed in the near zone.

In order for the wearer to perceive viewing as pleasant when changing from distant vision to near vision, the imaging properties of the spectacle lens can also be favorably influenced in that the preferred distance of the object in the near zone is incorporated by the spectacle lens or the eye of the spectacle wearer already as correction in the design of the lens surface facing away from the eye.

If the eyesight deficiency compensation also includes a nominal prismatic power of the spectacle lens, it is also advantageous to take an interaction between the nominal prismatic power and the multifocal property of the spectacle lens into consideration in designing the lens surface facing away from the eye in terms of compensation.

Thickness of the spectacle lens.

Depending on the diameter and design of the spectacle frame desired for the spectacle lens, different thicknesses of the spectacle lens are required. The thickness of the lens may, for example, be defined at the far-vision reference point or at the center of the lens. In this respect, it is likewise favorable to take the thickness into consideration as far as the above-mentioned alterations are concerned.

In the spectacle lens according to the present invention one of the two lens surfaces thus has a surface shape which is merely composed of a sphere and a torus. Such a surface shape is comparatively easy to prepare in mass production in which, however, each spectacle lens can be prepared with different spheres or tori by grinding using appropriately designed grinding tools. The lens surface facing away from the eye has a more complicated shape, because, on the one hand, it provides a multifocal property and, on the other hand, the above-described compensation of the interaction between the eyesight deficiency correction and the multifocal property and an optimization in respect of the positioning of the spectacle lens relative to the spectacle wearer.

The spectacle lens is particularly suitable for an automatic mass production in which each spectacle lens produced can be produced with an individual design of the lens surface facing towards the eye for the correction of different eyesight deficiencies of a multiplicity of spectacle wearers.

Accordingly, a second aspect of the present invention relates to the provision of a spectacle lens family comprising a plurality of spectacle lenses which are particularly suitable for individual mass production. The spectacle lens family of the invention is based on a common design of the multifocal property. On the basis of a given near-vision reference point and a given far-vision reference point as well as the difference in the mean dioptric powers at the near-vision and far-vision reference points ("addition"), said design comprises a specific distribution of astigmatic and spherical aberrations in the field of view of the spectacle wearer. This distribution of the spherical and astigmatic aberrations can characterize the spectacle lens family due to the multifocal property and distinguishes the same from other spectacle lens families. On the other hand, individual members of the spectacle lens family differ from one another in respect of the eyesight deficiency correction, i.e., in the nominal dioptric power or/and the nominal prismatic power, while exhibiting substantially the same or similar multifocal properties. Such spectacle lenses are particularly suitable for being produced in common as a spectacle lens family.

There are pairs of individual members of the spectacle lens family differing in respect of their nominal spherical or/and astigmatic power by less than 1 diopter, in particularly by less than 0.5 diopters, and in particular by 0.25 diopters.

1 diopter, 0.5 diopters and 0.25 diopters, respectively, are thus a "dioptric pitch" with which the spectacle lenses of the spectacle lens family are offered as far as the nominal spherical and astigmatic powers are concerned.

Although the function of the eyesight deficiency correction is a result of the shape of the lens surface facing towards the eye, and the multifocal properties of the members of the spectacle lens family are substantially the same or similar and provided by the lens surfaces facing away from the eye, the lens surfaces of the spectacle lenses facing away from the eye are nevertheless different in shape. This is due to the fact that the design of the multifocal property results into a basic shape of the lens surface facing away from the eye. However, this basic shape is then modified to take account of the effect of the different nominal spherical, astigmatic and prismatic powers, respectively, on the multifocal property and to influence the same such that the effect of the multifocal properties of the spectacle lens family on the wearer is substantially the same or similar.

The modification of the basic shape of the lens surface facing away from the eye advantageously comprises also the parameters mentioned above: eye distance of the spectacle wearer or/and distance between the eye and the spectacle lens or/and inclination of the spectacle lens relative to a sightline or/and preferred distance between the object viewed in the near zone and the eye or spectacle lens or/and a nominal prismatic power of the spectacle lens for the correction of a further eyesight deficiency or/and thickness of the spectacle lens.

BRIEF DESCRIPTION OF THE DRAWINGS

The invention will now be described in further detail on the basis of embodiments with reference to the accompanying drawings, wherein FIG. 5 is a table for illustrating the surface coordinates of the basic shape of the lens surface facing away from the eye according to one embodiment of the spectacle lens family of the present invention, FIG. 6 is a table for illustrating the coordinates of deviations from the basic shape of a spectacle lens of the spectacle lens family with a low nominal astigmatic power, FIG. 7 is a table for illustrating the surface coordinates of the spectacle lens with the deviations according to FIG. 6, FIG. 8 is a table for illustrating the coordinates of deviations from the basic shape of a spectacle lens of the spectacle lens family having a relatively high nominal astigmatic power, FIG. 9 is a table for illustrating the surface coordinates of the spectacle lens with the deviations according to FIG. 8.

DETAILED DESCRIPTION

Figure 1:
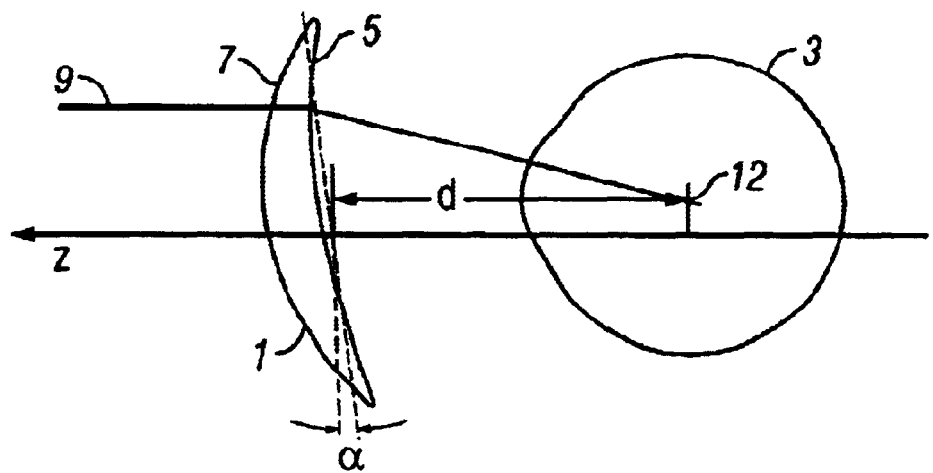
FIG. 1 is a schematic representation of the position of the spectacle lens of the present invention in front of the eye of a spectacle wearer.

FIG. 1 is a schematic representation of the position of a spectacle lens 1 of the present invention in front of an eye 3 of a spectacle wearer. The spectacle lens 1 comprises a lens surface 5 facing towards the eye 3 as well as a lens surface 7 facing away from the eye. The Figure furthermore illustrates schematically the path of a light beam 9 through the spectacle lens 1 to the center 12 of the eye 3. The lens 1 is generally curved, as it is common practice in spectacle lenses, so that the lens surface 7 is of convex shape and, accordingly, the lens surface 5 is of concave shape.

The lens surface 5 facing toward the eye substantially serves to correct an astigmatic eyesight deficiency of 0.5 diopters, the corresponding cylinder axis being oriented at an angle of 90° to the normal. A corresponding cylindrical cut is introduced into the lens surface 5.

Figure 10:
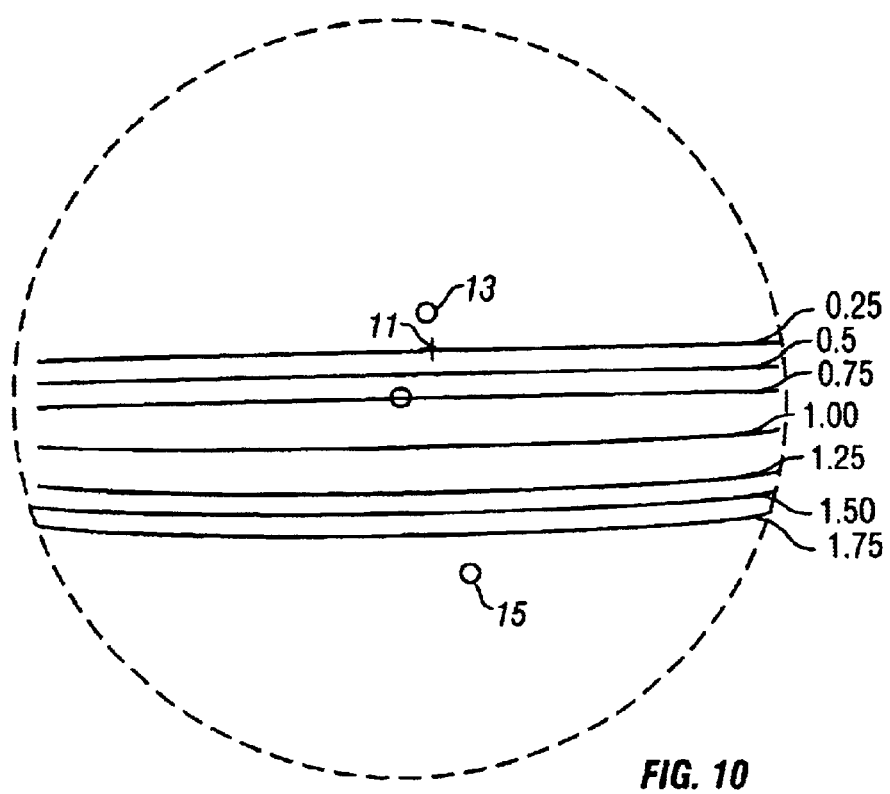
FIG. 10 shows a desired non-realizable ideal distribution of a mean spherical power in the field of view, and FIG. 11 a desired distribution of the mean spheric power in the field of view of a spectacle lens which is closer to reality.

The lens surface 7 facing away from the eye serves to provide the spectacle lens 1 with a multifocal property. A possible desired ideal design of a multifocal property of the spectacle lens 1 is shown in FIG. 10. This Figure shows a lens center 11, a far-vision reference point 13 and a near-vision reference point 15 in the field of view of the spectacle wearer and illustrates the distribution of the mean spherical power of the spectacle lens in the field of view.

Here, the spectacle wearer's sightline passes through an area around the far-vision reference point 13 if the spectacle wearer's view is directed approximately horizontally and to the distance. The sightline passes through the near-vision reference point 15 if, as is illustrated in FIG. 2, a near object 17 is focussed with a downwardly directed sightline.

Figure 2:
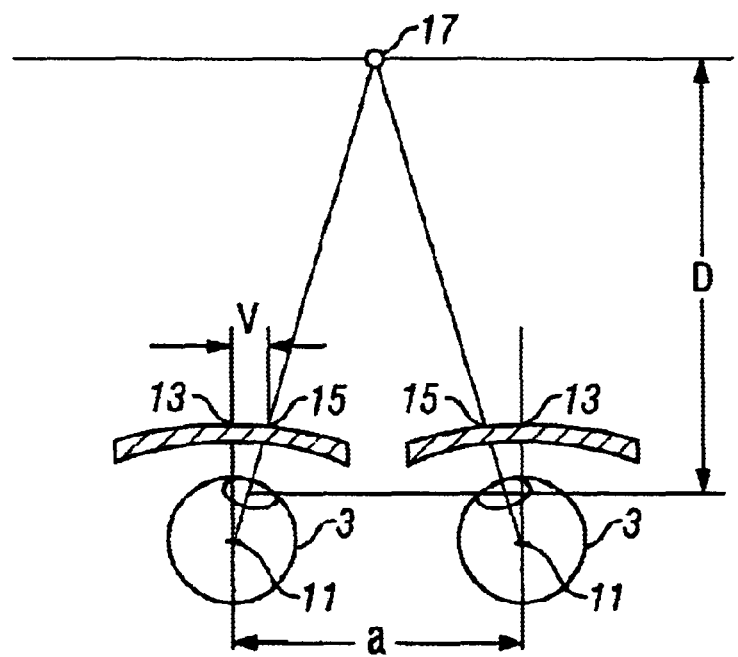
FIG. 2 is a schematic representation of the viewing of an object in the near zone through spectacle lenses of the present invention.

It is apparent from the representations of FIGS. 2 and 10 that the near-vision and far-vision reference points 13, 15 are not only spaced apart from one another in vertical direction but also that the near-vision reference point 15 is offset horizontally inwardly relative to the far-vision reference point 13 by a distance v, i.e., towards the nose of the spectacle wearer.

The mean spherical power of the spectacle lens at the far-vision reference point 13 differs from the mean spherical power at the near-vision reference point 15 by 2 diopters, i.e., the so-called "addition" is 2.0.

As is apparent from FIG. 10, the mean spherical power increases continuously from the far-vision reference point 13 to the near-vision reference point 15 along a connecting line between the far-vision reference point and the near-vision reference point, with lines of the same spherical power extending approximately horizontally in the field of view.

A desired ideal spectacle lens providing the multifocal property according to FIG. 10 desirably would exhibit, except for a nominal astigmatic dioptric power for the correction of the eyesight deficiency of the spectacle wearer, an astigmatic power of Zero at all points of the field of view in order not to produce any distortions of the image, if possible.

Such an ideal spectacle lens, that is a spectacle lens exhibiting, except for the nominal spherical power for the correction of the eyesight deficiency, an ideal distribution of the mean spherical power according to FIG. 10 and, except for the nominal astigmatic power for the correction of the eyesight deficiency, an ideal astigmatic power of Zero is on principle not realizable.

Figure 11:
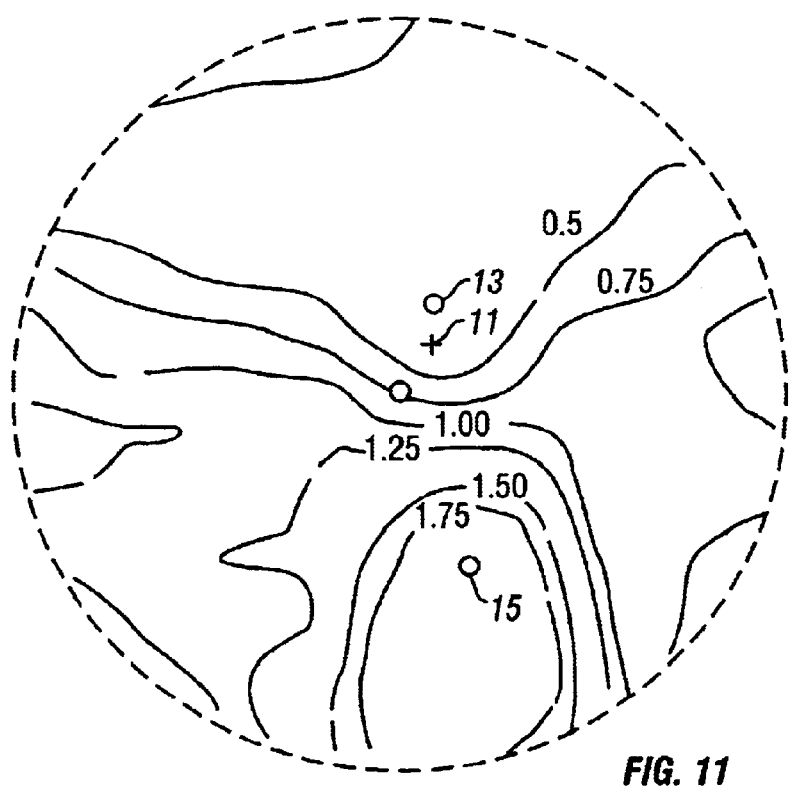

FIG. 11 illustrates a more realistic design of a desired multifocal property of a spectacle lens, said Figure showing lines of the same mean spherical power after subtraction of the nominal spherical power for the correction of the eyesight deficiency. If one now strives to realize the desired distribution of the mean spherical power shown in FIG. 11 in a spectacle lens wherein the astigmatic power is Zero at all points of the field of view, expect for the nominal astigmatic power for the correction of the eye deficiency, this is on principle not possible either. Because astigmatic aberrations are automatically generated in the field of view if one tries to change the mean spherical power in the field of view position-dependent.

Be it assumed that the distribution of the desired mean spherical power according to FIG. 11 and an astigmatic power of Zero everywhere in the field of view is a desired goal in the design of the spectacle lens exhibiting a multifocal property. As this is impossible, a distribution of aberrations in respect of the astigmatic power and a distribution of aberrations in respect of the mean spherical power in the field of view are developed which are perceived as pleasing by the wearer. A possible distribution of aberrations of the astigmatic power is shown in FIG. 3 and a possible distribution of the spherical aberrations in the field of view is shown in FIG. 4.

Multifocal property designs are usually perceived as pleasing by the spectacle wearer if the aberrations are very small in the area directly at the near-vision reference point and the far-vision reference point, if they are relatively small in a relatively wide area above the far-vision reference point 13, if they are likewise relatively small in a channel-like connecting area between the far-vision reference point 13 and the near-vision reference point 15 and if they are likewise relatively small in a slightly enlarged area below the near-vision reference point 15. As compared to that, the aberrations may then be slightly increased in the other areas (see FIGS. 3 and 4).

Figure 3:
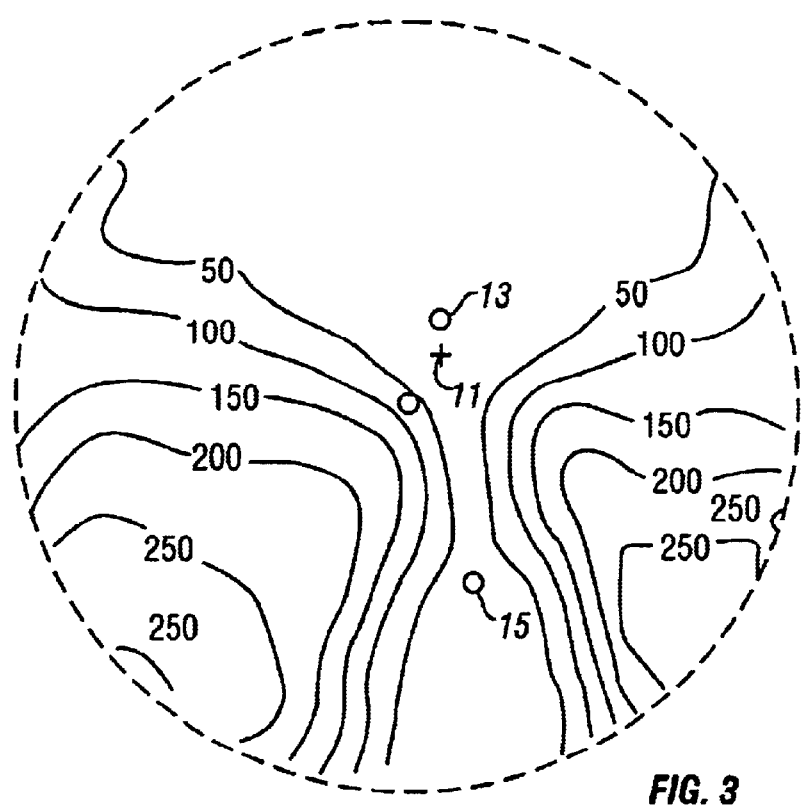
FIG. 3 is a representation of astigmatic aberrations in the field of view of one design of a multifocal property of the spectacle lens shown in FIG. 1.
Figure 4:
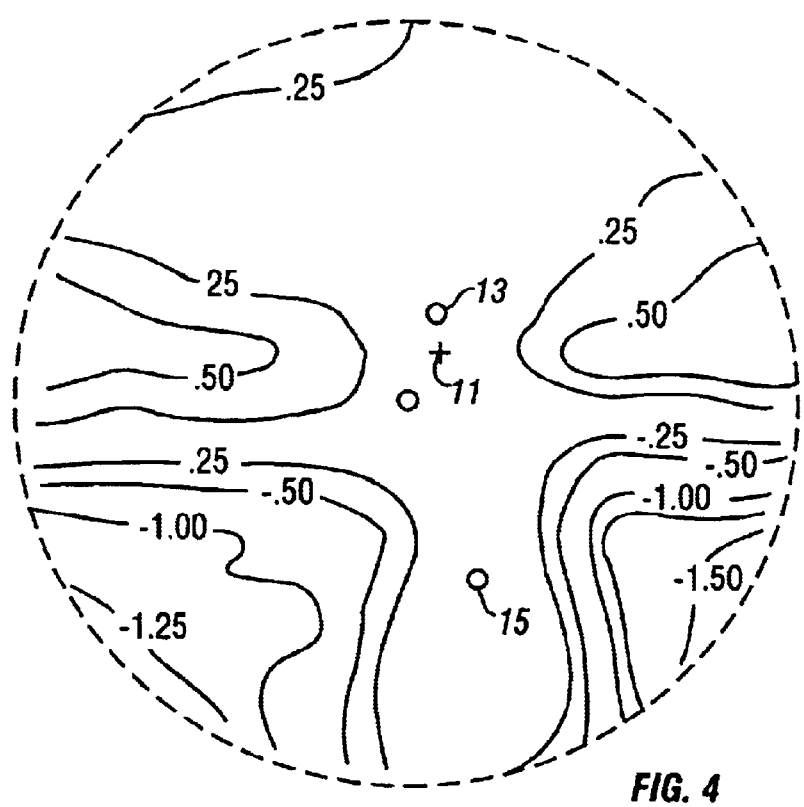
FIG. 4 is a representation corresponding to that of FIG. 3 of the spherical aberrations in the field of view of the design of the multifocal property of the spectacle lens shown in FIG. 1.

Such a design of the multifocal properties of lens 1 (as shown in FIGS. 3 and 4) is provided by a multiplicity of other lenses which differ from lens 1 at least in respect of their nominal dioptric power. Such spectacle lenses with different nominal dioptric power and common multifocal property are combined to form an embodiment of a spectacle lens family according to the present invention. The lens surfaces 7 of the spectacle lenses facing away from the eye have a common basic shape which is substantially designed to provide the common multifocal property. Moreover, the lens surfaces 7 facing away from the eye deviate from said basic shape to take interactions between the multifocal property and the nominal dioptric power and furthermore an interaction between the multifocal property and the spatial position of the spectacle lens 1 in front of the eye 3 of the spectacle wearer into consideration. Parameters which characterize the position of lens 1 in front of the eye 3 are the distance d of the lens 1 from the center of the eye 11, the inclination $\alpha$ of the lens in respect of a direction of the sightline straight forward through the lens, the distance a between the eye centers 12 of both eyes 3 of the spectacle wearer and a distance D between the eye 3 and the object 17 to be viewed when the same is disposed in the near zone at a distance which is perceived as pleasing.

The deviations from the basic shape can be determined for each particular instance of a spectacle lens to be manufactured by means of an optimization calculation taking into consideration the above-mentioned parameters such that the multifocal property which characterizes the spectacle lens family is substantially obtained.

The optimization calculation may be conducted as follows:

First of all, a nominal multifocal property is taken as a basis which is determined by the desired distribution of the spherical and astigmatic aberrations in the field of view, as is shown, for example, in FIGS. 3 and 4. The distribution of the astigmatic and spheric aberrations in the field of view corresponds to a deviation of the astigmatic and the mean spherical powers of the lens to be manufactured from the astigmatic and mean spherical powers, respectively, of a desired, but non-realizable ideal lens. The desired ideal lens, for example, may exhibit the distribution of the mean spherical power as that shown in FIG. 11 or even in FIG. 10.

Subsequently, e.g. a ray-tracing method which comprises tracing the beams from an object through the spectacle lens to the eye of a simulated spectacle wearer is employed to determine the spherical and astigmatic powers for a multiplicity of points of the field of view for a lens whose lens surface facing away from the eye exhibits the basic shape and whose lens surface facing towards the eye is provided such that the nominal dioptric power is obtained.

The nominal spherical dioptric power and the astigmatic dioptric power for the correction of the eyesight deficiency are then subtracted from the values of the mean spherical power and the astigmatic power, respectively, obtained by simulation at the various points of the field of view. The spherical power and astigmatic power of the desired ideal lens at the respective points are then subtracted from the resulting spherical power and astigmatic power, respectively, at the different points. As a result thereof, a distribution of spherical aberrations and astigmatic aberrations in the field of view is obtained which at first deviates from the distribution shown in FIG. 4 and FIG. 3, respectively. It is the aim of the optimization to modify the shape of the lens surface facing away from the eye such that the calculated distribution of the spherical and astigmatic aberrations in the field of view corresponds substantially to the distribution shown in FIG. 4 and FIG. 3, respectively. To this end, the lens surface which faces away from the eye and results from the above-described basic shape is modified such that the deviations between the spherical and astigmatic aberration values obtained by simulation and the aberrations values given by the nominal multifocal property (see FIG. 4 and 3) are reduced.

Subsequently, in a next step of the optimization calculation a new lens surface facing away from the eye is taken as a basis that comprises the determined deviations. Subsequently, new deviations are determined and the lens surface facing away from the eye is again corrected. This procedure can be repeated until the deviations between the nominal multifocal property and the multifocal property provided by the calculated lens are sufficiently small.

For example, a difference value between spherical and astigmatic aberrations of the nominal multifocal property and the optimized spectacle lens can serve as a criterion for this purpose and it must be kept under this difference value at all points of a region of the field of view. Such a difference value is preferably 0.5 diopters, in particular 0.25 diopters and more preferred 0.1 diopters. The region of the field of view or lens surface which is taken into consideration here comprises more than 75% of the lens surface, in particular more than 85% of the lens surface and more preferred more than 95% of the lens surface.

FIG. 5 illustrates in tabular form the surface coordinates of the basic shape for one embodiment of the spectacle lens family of the present invention, namely for the provision of a multifocal property with an addition of 2.0. The columns correspond to the X coordinates of the measuring points at a distance of 2.5 mm each, the lines correspond to the Y coordinates of the measuring points likewise at a distance of 2.5 mm and the table entries correspond to the Z coordinates of the surface of the basic shape in mm.

Such a design of the basic shape can be empirically developed with the aid of test persons and results into the distribution of the spherical and astigmatic aberrations illustrated in FIGS. 3 and 4.

It is also possible to measure an already existing spectacle lens which is perceived as advantageous by a spectacle wearer to obtain therefrom the distribution of the spherical and astigmatic aberrations of the existing spectacle lens and to derive therefrom the basic shape which is taken as a basis for the production of further spectacle lenses.

FIG. 6 is a tabular representation corresponding to that of FIG. 5 of the deviation from the basic shape of the lens surface 7 of the spectacle lens 1 facing away from the eye with a nominal spherical power of 0.0 and a nominal astigmatic power of 0.5 diopters with an axis position of 90° and a lens diameter of 70 mm. These deviations are numerically determinable by an optimization method such that eventually the deviations illustrated in FIGS. 3 and 4 are substantially obtained, taking into consideration the nominal dioptric power as well as optionally the above mentioned parameters d, $\alpha$, a, D as well as the lens thickness. As far as the present embodiment is concerned, average values of typical spectacle wearers were used for parameters d, $\alpha$, a, D.

Aberrations which are substantially similar to those illustrated in FIGS. 3 and 4 are obtained for a further spectacle lens which is likewise a member of the above-mentioned spectacle lens family and has a nominal spherical power of −3.0 diopters as well as a nominal astigmatic power of 4.0 diopter with an axis position of 60° and a lens diameter of 70 mm. The deviation thereof from the basic shape according to FIG. 5 is represented in the table of FIG. 8, wherein the finished shape of the lens surface of this spectacle lens facing away from the eye, which is a combination of the basic shape of FIG. 5 and the deviation of FIG. 8, is represented in FIG. 9.

A turning process is for example suitable for the manufacture of the lens surface facing away from the eye in which the spectacle lens is retained on a rotating disc and a turning tool moves relative to the rotating disc from a radially inward position to a radially outward position and at the same time up and down in axial direction corresponding to the surface coordinates of the lens surface 7 in order to remove lens material and finally produce the shape of the surface. Subsequently, the lens surface can be subjected to a grinding process or/and a polishing process. As such grinding and polishing processes cause a loss of material which is not necessarily homogenous throughout the entire lens surface, such an inhomogeneous loss of material occurring during the grinding or polishing process can be taken into consideration in that the surface produced by the turning tool is formed with an excess of material at those position which are known to suffer a higher loss of material.

In the above description the lens surface facing towards the eye is described as the lens surface which directly serves to correct the eyesight deficiency, whereas the lens surface facing away from the eye provides the multifocal property and additional corrections. However, the spectacle lens may also be designed such that the lens surface facing towards the eye provides the multifocal properties and corrections, whereas the lens surface facing away from the eye serves to correct the eyesight deficiency.

What is claimed is:

1. A method for the manufacture of a spectacle lens for the correction of an eyesight deficiency of a spectacle wearer, wherein said spectacle lens exhibits a multifocal property so that along a line between a far-vision reference point of the spectacle lens and a near-vision reference point spaced apart therefrom a mean spherical power of the spectacle lens changes continuously from a first value at the far-vision reference point to a second value at the near-vision reference point, wherein the method comprises:

providing a predetermined distribution of spherical and astigmatic aberrations in the field of view of the spectacle wearer and that dependent on the desired difference between the first value and the second value, providing a desired nominal dioptric power of the spectacle lens, determining a shape of a first lens surface of the spectacle lens dependent on the desired nominal dioptric power of the spectacle lens, determining a shape of a second lens surface of the spectacle lens, manufacturing the spectacle lens according to the determined shape of the lens surface facing away from the eye of the spectacle wearer and the determined shape of the lens surface facing towards the eye of the spectacle wearer, wherein the shape of the second lens surface is determined such that the finished spectacle lens exhibits substantially the predetermined aberration distribution in the field of view.

2. The method according to claim 1, wherein the predetermined distribution of the spherical aberrations is substantially equal to a difference between a predetermined distribution of a spherical power in the field of view and a distribution of the mean spherical power in the field of view of the finished spectacle lens reduced by the nominal spherical dioptric power.

3. The method according to claim 1, wherein the predetermined distribution of the astigmatic aberrations is substantially equal to a difference between a predetermined distribution of an astigmatic power in the field of view and a distribution of the astigmatic power in the field of view of a finished spectacle lens reduced by the nominal astigmatic dioptric power.

4. The method according to claim 3, wherein the predetermined distribution of the astigmatic power in the field of view provides an astigmatic power of substantially Zero at substantially all points of the field of view.

5. The method according to claim 1, wherein the first lens surface of the spectacle lens is the lens surface facing towards the eye of the spectacle lens wearer and the second lens surface is the lens surface facing away from the eye of the spectacle wearer.

6. The method according to claim 1, further comprising: providing a desired distance between two eyes of the spectacle wearer, wherein the shape of the second lens surface is provided taking into consideration a desired distance between the two eyes.

7. The method according to claim 1, further comprising: providing a desired distance between an eye of the spectacle wearer and the spectacle lens, wherein the shape of the second lens surface is provided taking into consideration a desired distance between the eye of the spectacle wearer and the spectacle lens.

8. The method according to claim 1, further comprising: providing a desired inclination of the spectacle lens in respect of a sightline of the spectacle wearer in a predetermined position of use of the spectacle lens, wherein the shape of the second lens surface is provided taking into consideration the desired inclination.

9. The method of claim 1, further comprising: providing a desired distance between an eye of the spectacle wearer and an object to be viewed, namely when viewing through the near-vision reference point of the spectacle lens, wherein the shape of the second lens surface is provided taking into consideration a desired distance between the eye and the object to be viewed.

10. The method according to claim 1, further comprising: providing a desired nominal prismatic power of the spectacle lens, wherein the shape of the second lens surface is provided taking into consideration a desired nominal prismatic power.

11. The method according to claim 1, further comprising: providing a desired thickness of the spectacle lens, wherein a determination of the shape of the second lens surface is effected taking into consideration a desired thickness.

12. The method according to claim 1, further comprising: providing a basic shape of the lens surface facing away from the eye of the spectacle wearer dependent on the predetermined aberration distribution, wherein the determination of the shape of the second lens surface comprises a modification of the basic shape.

13. The method according to claim 12, wherein the modification is effected iteratively.

14. The method according to claim 1, wherein a determination of the shape of the second lens surface is effected such that the distribution of the astigmatic aberrations of a finished lens and a predetermined distribution of the astigmatic aberrations at points corresponding to one another of a region of the field of view differ from one another by a difference value which is less than 0.5 diopters.

15. The method according to claim 1, wherein a determination of the shape of the second lens surface is effected such that the distribution of the spherical aberrations of a finished lens and the predetermined distribution of the spherical aberrations at points corresponding to one another of a region of the field of view differ from one another by a difference value which is less than 0.5 diopter.

16. The method according to claim 14, wherein the difference value is less than 0.25 diopters.

17. The method according to claim 14, wherein the region comprises an area of more than 75% of the lens surface.

18. The method according to claim 2, wherein the predetermined distribution of the astigmatic aberrations is substantially equal to a difference between a predetermined distribution of an astigmatic power in the field of view and a distribution of the astigmatic power in the field of view of the finished spectacle lens reduced by the nominal astigmatic dioptric power.

19. The method according to claim 14, wherein the difference value is less than 0.1 diopters.

20. The method according to claim 15, wherein the difference value is less than 0.25 diopters.

21. The method according to claim 15, wherein the difference value is less than 0.1 diopters.

22. The method according to claim 14, wherein the region comprises an area of more than 85% of the lens surface.

23. The method according to claim 15, wherein the region comprises an area of more than 75% of the lens surface.

24. The method according to claim 15, wherein the region comprises an area of more than 85% of the lens surface.

25. The method according to claim 16, wherein the region comprises an area of more than 75% of the lens surface.

26. The method according to claim 16, wherein the region comprises an area of more than 85% of the lens surface.

27. A spectacle lens family comprising a plurality of spectacle lenses, each spectacle lens of the spectacle lens family comprising:
  a nominal dioptric power for the correction of an eyesight deficiency of a spectacle wearer,
  a multifocal property such that along a line between a far-vision reference point and a near-vision reference point spaced apart therefrom a mean spherical power changes continuously from a first value at the far-vision reference point to a second vaule at the near-vision reference point,
  wherein the spectacle lenses of the spectacle lens family each exhibit the same difference between the first value and the second value and nominal dioptric powers which are different from one another,
  wherein the shape of a first lens surface of the spectacle lenses is formed of a sphere and/or a torus in order to obtain the respective nominal dioptric power, wherein the spectacle lenses of the spectacle lens family have a basic shape of a second lens surface of the spectacle lens in common which provides the multifocal property, and
  wherein the shape of the second lens surface of each spectacle lens of the spectacle lens family deviates from said basic shape dependent on the respective nominal dioptric power to obtain, with different nominal dioptric powers of different spectacle lenses, a substantially similar distribution of the spherical and astigmatic aberrations in the field of view which are given by the multifocal property.

28. The spectacle lens family according to claim 27, comprising a multiplicity of pairs of spectacle lenses, the nominal spherical or/and astigmatic powers of which differ by less than 1 diopter.

29. The spectacle lens family according to claim 28, wherein pairs of spectacle lenses have different shapes of the lens surfaces facing away from an eye.

30. The spectacle lens family according to claim 27, comprising a multiplicity of pairs of spectacle lenses, the nominal spherical or/and astigmatic powers of which differ by less than 0.5 diopters.

31. The spectacle lens family according to claim 27, comprising a multiplicity of pairs of spectacle lenses, the nominal spherical or/and astigmatic powers of which differ by less than 0.25 diopters.

32. A spectacle lens for the correction of an eyesight deficiency of a spectacle wearer, comprising a first lens surface and a second lens surface,
  wherein the shape of the first lens surface of the spectacle lens is formed of a sphere or a torus to obtain a nominal dioptric power of the spectacle lens for correction of the eyesight deficiency,
  wherein the shape of the second lens surface is provided so as to produce a multifocal property of the spectacle lens such that along a line between a far-vision reference point of the spectacle lens and a near-vision reference point spaced apart therefrom the mean spherical power continuously changes from a first value at the far-vision reference point to a second value at the near-vision reference point,
  and wherein the shape of the second lens surface is furthermore designed, dependent on one or more of the following characteristics consisting of: a nominal dioptric power at the far-vision reference point, a distance between the two eyes of the spectacle wearer, a distance between an eye of the spectacle wearer and the spectacle lens in its predetermined predetermined position of use, an inclination of the spectacle lens in respect of a sightline of the spectacle wearer in the predetermined position of use of the spectacle lens, a desired distance between the eye of the spectacle lens wearer and an object to be viewed in the predetermined position of use of the spectacle lens, a nominal prismatic power of the spectacle lens in the predetermined position of use of the spectacle lens, and a thickness of the spectacle lens.

* * * * *

UNITED STATES PATENT AND TRADEMARK OFFICE
CERTIFICATE OF CORRECTION

PATENT NO. : 6,709,106 B2
DATED : March 23, 2004
INVENTOR(S) : Kelch et al.

It is certified that error appears in the above-identified patent and that said Letters Patent is hereby corrected as shown below:

<u>Title page,</u>
Item [56], References Cited, U.S. PATENT DOCUMENTS, please insert:
-- 4,514,061      4/1985      Winthrop      351/169
    6,193,370      2/2001      Shirayanagi      351/177 --
FOREIGN PATENT DOCUMENTS, please insert:
-- EP      EP 0 809 127      11/1997 --
Item [73], Assignee, please change: "Carl-Zeiss-Stiftung" to -- Carl-Zeiss-Stiftung trading as Carl Zeiss --
Item [*] Notice, please change "297" to -- 336 --

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO.    : 6,709,106 B2
DATED         : March 23, 2004
INVENTOR(S)   : Gerhard Kelch et al.

It is certified that error appears in the above-identified patent and that said Letters Patent is hereby corrected as shown below:

Title page,
Item [56], References Cited, OTHER PUBLICATIONS, first reference, please replace the word "Schlub" with -- Schluss --

Column 3,
Line 10, replace "an" with -- and --

Column 11,
Line 35, replace "vaule" with -- value --

Column 12,
Line 41, delete the first appearance of the word "predetermined"

Signed and Sealed this

Twenty-eighth Day of June, 2005

JON W. DUDAS
*Director of the United States Patent and Trademark Office*